Sept. 26, 1950 — L. J. HAUPT — 2,523,658
HOSE SUPPORT
Filed June 1, 1946
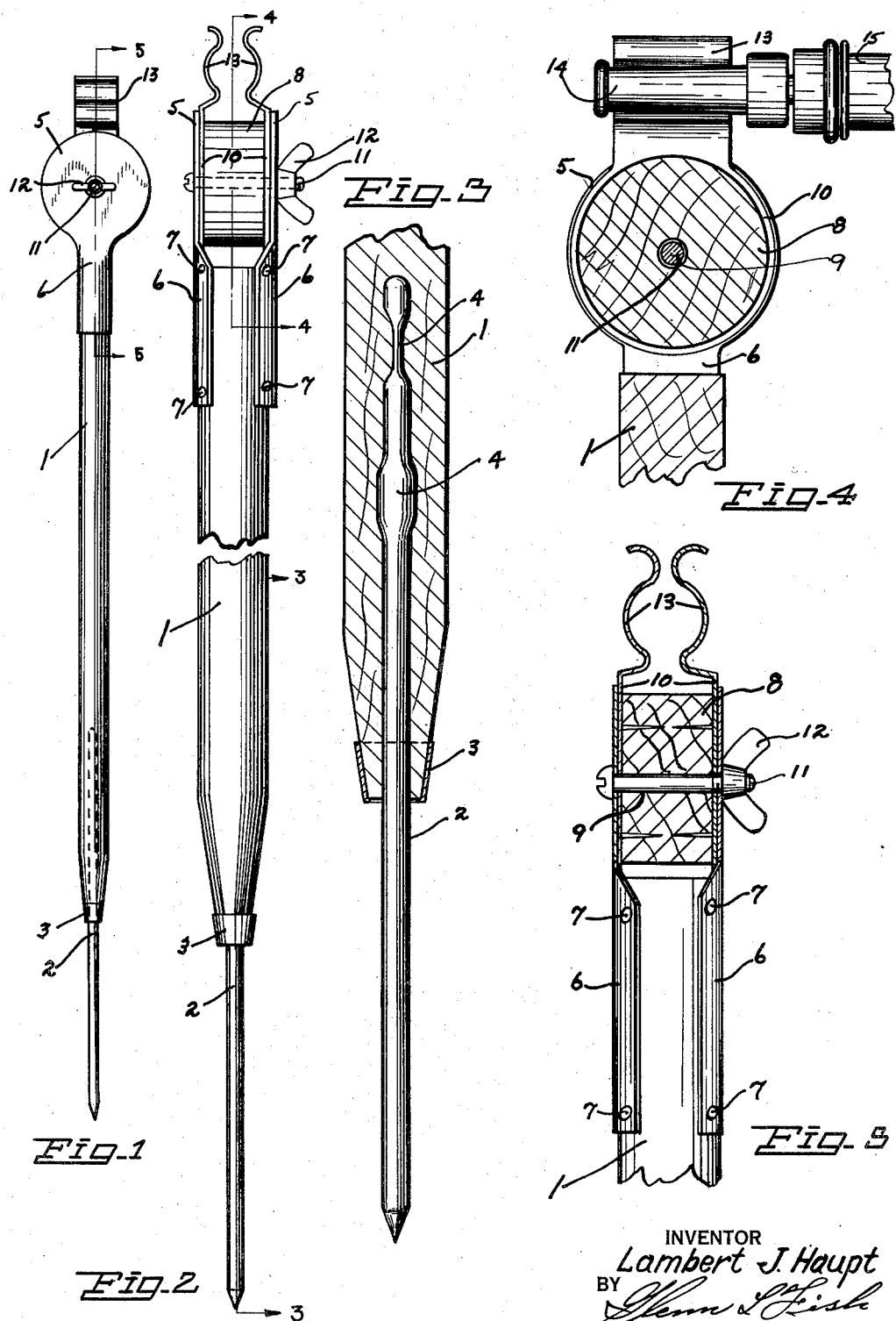
INVENTOR
Lambert J. Haupt
BY
ATTORNEY Patented Sept. 26, 1950

2,523,658

UNITED STATES PATENT OFFICE 2,523,658

HOSE SUPPORT

Lambert J. Haupt, Spokane, Wash.

Application June 1, 1946, Serial No. 673,856

1 Claim. (Cl. 248—87)

This invention relates to a hose support and it is one object of the invention to provide a hose support including in its construction a staff or stake adapted to be forced into the ground and having at its upper end a clamp so formed that it will firmly grip a hose nozzle from which water is to be sprayed.

Another object of the invention is to provide a hose support wherein the clamp at the upper end of the staff is so mounted that it may be turned and disposed in desired angular relation to the staff so that the direction in which water is discharged from the hose nozzle will be controlled.

Another object of the invention is to provide a hose support having a clamp consisting of jaws mounted at opposite sides of a spool or drum which is rotatably mounted about a bolt passed through disks at opposite sides of the stake, the bolt carrying a winged nut by means of which it may be tightened to force the disks towards the drum and firmly grip the drum to hold it in a set position.

Another object of the invention is to provide a hose support having a spike embedded in and projecting downwardly from the staff, the spike being so formed that it will be firmly held in place and prevented from working loose from the stake or staff.

The invention is illustrated in the accompanying drawings wherein:

Fig. 1 is a side view of the improved hose support.

Fig. 2 is a view upon an enlarged scale taken at right angles to Figure 1.

Fig. 3 is a view showing the lower portion of the staff in longitudinal section and the spike in elevation, taken on line 3—3 of Figure 2.

Fig. 4 is a sectional view taken vertically through the upper portion of the hose support along line 4—4 of Figure 1.

Fig. 5 is a sectional view taken along the line 5—5 of Figure 1.

This improved hose support includes in its construction a stake or staff 1 which may be formed of wood or other suitable material. A spike 2 is embedded in the lower portion of the staff and projects downwardly from the staff, its length being such that when the spike is forced into the ground the staff will be supported in an upright position. A ferrule 3 fits tightly about the lower end of the staff to prevent it from splitting. Referring to Figure 3 it will be seen that near its upper end the spike has portions 4 flattened from opposite sides of the spike, thus providing anchoring portions which will prevent the spike and the handle from turning relative to each other.

At opposite sides of the upper end of the staff are metal disks 5 which are provided with depending shanks 6 curved transversely so that when they are secured against opposite side portions of the staff by nails 7 they will fit closely against the staff and be braced against tilting transversely of the staff. Between the disks is a spool or drum 8 which may be formed of wood and at its center is bored to form a passage lined by a metal sleeve or tube 9. Plates 10 are secured against opposite side or end faces of the spool and at their centers the plates are formed with openings which register with the sleeve 9 and also with openings formed at centers of the disks 5 so that a bolt 11 may be passed through the disks and the sleeve to rotatably mount the spool. The threaded end portion of the bolt carries a winged nut 12, and when this nut is tightened the spool will be gripped between the disks 5 and firmly held against turning about the bolt. Strips or tongues extend from the side plates 10 and are bent to form jaws 13 between which the nozzle 14 of a hose 15 is gripped as shown in Figure 4. By loosening the nut 12 the spool will be released and the nozzle shifted with the spool about the bolt until the jaws and the nozzle extend in desired angular relation to the staff. Therefore water discharged from the hose nozzle may be caused to flow in a desired angular path and grass or flowers may be watered without being damaged by striking force of a stream of water.

Having thus described the invention, what is claimed is:

A hose support comprising a staff adapted to be supported in upright position circular, side plates above said staff disposed at opposite sides thereof and being formed of resilient metal and having depending shanks firmly secured against opposite side portions of the staff and extending longitudinally thereof, a circular spool between said side plates, metal disks mounted against opposite side faces of said spool and being of less diameter than the side plates, tongues formed integral with and extending radially from said disks and being opposite each other and bent towards each other and then bent outwardly to form outwardly bowed arcuate jaws for gripping a hose nozzle between them, a bolt passing through the spool axially thereof with its end portions passing through centers of the disks and the side plates and having a head at one end engaging the outer side face of one side and its other end portion threaded, and a winged nut screwed upon the threaded end portion of the bolt for engaging the outer face of the other side plate and when tightened drawing the side plates towards each other and thereby causing frictional binding grip between the side plates and the disks to secure the spool in an adjusted position with the jaws and a hose nozzle gripped between them extending in desired angular relation to the staff.

LAMBERT J. HAUPT.

REFERENCES CITED

The following references are of record in the file of this patent:

UNITED STATES PATENTS

| Number | Name | Date |
|---|---|---|
| 939,859 | Pullen | Nov. 9, 1909 |
| 1,566,232 | Schreiter | Dec. 15, 1925 |
| 1,803,153 | Trepte | Apr. 28, 1931 |
| 2,060,390 | Adams | Nov. 10, 1936 |
| 2,204,692 | Parisio | June 18, 1940 |

FOREIGN PATENTS

| Number | Country | Date |
|---|---|---|
| 192,787 | Great Britain | Feb. 15, 1923 |